(12) United States Patent
Gopalan (10) Patent No.: US 10,100,163 B2
(45) Date of Patent: *Oct. 16, 2018

(54) SUBSTRATE INDEPENDENT COPOLYMERS FOR BIOFUNCTIONALIZATION

(71) Applicant: Wisconsin Alumni Research Foundation, Madison, WI (US)

(72) Inventor: Padma Gopalan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 323 days.

This patent is subject to a terminal disclaimer.

(21) Appl. No.: 14/724,104

(22) Filed: May 28, 2015

(65) Prior Publication Data

US 2015/0344648 A1    Dec. 3, 2015

Related U.S. Application Data

(63) Continuation of application No. 11/924,803, filed on Oct. 26, 2007, now Pat. No. 9,051,667.

(51) Int. Cl.
| | |
|---|---|
| *C08J 5/18* | (2006.01) |
| *C08J 7/18* | (2006.01) |
| *C08J 5/12* | (2006.01) |
| *C40B 40/04* | (2006.01) |
| *C40B 50/18* | (2006.01) |

(52) U.S. Cl.
CPC . *C08J 5/18* (2013.01); *C08J 5/12* (2013.01); *C08J 7/18* (2013.01); *C40B 40/04* (2013.01); *C40B 50/18* (2013.01); *C08J 2300/00* (2013.01); *C08J 2333/14* (2013.01)

(58) Field of Classification Search
None
See application file for complete search history.

(56) References Cited

U.S. PATENT DOCUMENTS

| | | | |
|---|---|---|---|
| 9,051,667 B2* | 6/2015 | Gopalan | C40B 40/04 |
| 2002/0049152 A1* | 4/2002 | Nock | B01J 19/0046 435/176 |
| 2006/0147949 A1* | 7/2006 | Ha | B01J 19/0046 435/6.12 |

* cited by examiner

*Primary Examiner* — Christopher M Gross
(74) *Attorney, Agent, or Firm* — Bell & Manning, LLC (57) ABSTRACT

The present invention provides crosslinked epoxy-functional copolymer films and microarrays built from the crosslinked epoxy-functional copolymer films. Microarrays incorporating the copolymers include a substrate on which a film of the crosslinked epoxy-functional copolymer is disposed and target molecules bound to the copolymer film. The crosslinked polymer films are well-suited for use as scaffolds for target molecules in microarrays because they provide a high density of binding sites for the target molecules, are mechanically stable, and may be coated onto a wide range of substrates.

16 Claims, 6 Drawing Sheets

Specification includes a Sequence Listing.

SUBSTRATE INDEPENDENT COPOLYMERS FOR BIOFUNCTIONALIZATION

CROSS-REFERENCE TO RELATED APPLICATIONS

The present application is a continuation of U.S. patent application Ser. No. 11/924,803 that was filed Oct. 26, 2007, the entire contents of which are hereby incorporated by reference.

FIELD OF THE INVENTION

This invention relates to epoxy-functional copolymer films, microarrays incorporating the films, and methods of making the films.

BACKGROUND OF THE INVENTION

Biological microarrays have proven to be valuable tools, enabling the addressable, parallel analysis of thousands of different analytes. However, there is still room for improvement of the substrates upon which such microarrays have been developed. A microarray substrate desirably has the following characteristics: 1) its surface chemistry should be stable for multiple uses and provide reliable quantitative analysis; 2) it should give low autofluorescence and achieve a high signal-to-background ratio to allow the detection of low analyte concentrations, such as those encountered in gene expression analysis; and 3) it should enable localization of appropriate target molecules. Currently, most commercial microarray substrates are composed of monolayers of aldehyde, amine, or epoxide-functional molecules directly anchored to substrates such as glass, silicon or gold. Unfortunately, these monolayers present substrate-specific bonding characteristics and provide a limited density of functional groups.

Polymer films are an alternative to molecular monolayers for use as microarray substrates. However, such films typically suffer from poor stability in most mediums, leading to degradation and/or delamination of the film from the substrate. One approach to preventing delamination is to employ reactive polymer coatings wherein the polymer has functional groups that can covalently bind to specific groups on an underlying substrate. Unfortunately, this approach to stable functionalization requires modification of both the polymer and the substrate and is generally effective with only a few substrates, such as glass and silicon.

Epoxy-functional polymers are potential candidates for polymer coatings in microarrays. Epoxide-containing polymers have been previously used in various applications, including the production of films for anchoring small molecules and forming imaging layers. However, most of these polymers are uncrosslinked films with poor stability and a tendency to delaminate. In addition, the few reports that exist on the use of crosslinked films do not disclose decoupling the crosslinking chemistry from the binding chemistry and, therefore, are characterized by relatively low densities of functional groups available for binding after crosslinking has occurred.

SUMMARY OF THE INVENTION

The present invention provides crosslinked epoxy-functional copolymer films and microarrays built from the crosslinked epoxy-functional copolymer films. The films are characterized by high mechanical stabilities, high binding-site densities, and high signal-to-background (S/B) ratios. In addition, the films may be formed readily on a variety of substrates, including stainless steel and polycarbonate substrates, and may be patterned in order to control the localization and density of target molecules bound to the films. Methods of making and using the films are also provided.

In one basic embodiment, the microarrays include a substrate, a crosslinked epoxy-functional copolymer film disposed on the substrate and target molecules bound to the epoxy-functional copolymer film in a pattern. The copolymers incorporate at least two sets of polymerized monomers. The first set of monomers have pendent epoxide groups. These monomers react with target molecules, thereby immobilizing the target molecules on the copolymer film. The second set of monomers have pendent photocrosslinkable groups which are used to crosslink the copolymers into a film.

The microarrays may be formed by coating a substrate with a copolymer comprising a first set of polymerized monomers comprising pendent epoxide groups and a second set of polymerized monomers comprising pendent photocrosslinkable groups, photocrosslinking at least some of the photocrosslinkable groups to form a crosslinked film, and reacting at least some of the epoxide groups with target molecules to covalently immobilize the target molecules on the copolymer film. Because the crosslinking functionalities differ from the target immobilizing functionalities (i.e., the epoxide groups) the crosslinking step does not reduce the density of available target molecule binding sites on the polymer film. This is advantageous because it allows the degree of crosslinking and the target binding site density to be optimized independently. Thus, in some embodiments of the present copolymer films, the polymerized epoxy-functional monomers account for a much greater portion of the polymer than do the polymerized photocrosslinkable monomers. For example, the present copolymers may comprise at least about 80 mole percent (mol. %) epoxy-functional monomer, at least 90 mol. % epoxy-functional monomer, or at least 95 mol. % epoxy-functional monomer. Thus, the copolymers may include a relatively small proportion of photocrosslinkable monomers. For example the present copolymers may comprise 20 mol. % or less photocrosslinkable monomer, 10 mol. % or less photocrosslinkable monomer, or 5 mol. % or less photocrosslinkable monomer.

An example of a copolymer that is well-suited for use in the present microarrays is poly(glycidyl methacrylate-ran-2-(acryloyloxy)ethyl 2-methylacrylate). In this copolymer, the epoxy-functional glycidyl methacrylate (GMA) monomers provide pendent epoxide groups which are capable of reacting with amine groups on target molecules, including many biomolecules, in order to immobilize the biomolecules on the copolymer. The photocrosslinking acyloyloxy group of the 2-(acryloyloxy)ethyl 2-methylacrylate (2-AOEMA) monomers provide the crosslinking functionality.

The copolymer films desirably have a thickness of no more than about 100 nm and more desirably have a thickness of no more than about 50 nm. Limiting the thickness of the copolymer films reduces or eliminates delamination from the underlying substrate, resulting in a more mechanically stable film. This is particularly advantageous in microarrays wherein the underlying substrate (e.g., polycarbonate) does not form covalent bonds (or forms very few covalent bonds) with the crosslinked epoxy-functional copolymer films.

Once a microarray is fabricated it may be used to sense one or more signal-generating analyte molecules by exposing the microarray to a sample that contains, or is suspected of containing, a signal-generating analyte molecule which binds to one or more of the immobilized target molecules and detecting a signal generated from the bound analyte. The target molecules may be any molecules that interact with analyte molecules of interest in a detectable manner. For example, in a biological microarray, the target molecules may be biomolecules that specifically bind to fluorescently-labeled analyte molecules.

DETAILED DESCRIPTION OF THE PREFERRED EMBODIMENTS

The present invention provides crosslinked epoxy-functional copolymer films and microarrays built from the crosslinked epoxy-functional copolymer films. Microarrays incorporating the copolymers include a substrate on which a film of the crosslinked epoxy-functional copolymer is disposed and target molecules bound to the copolymer film. The crosslinked polymer films are well-suited for use as scaffolds for target molecules in microarrays because they provide a high density of binding sites for the target molecules, are mechanically stable, and may be coated onto a wide range of substrates.

The epoxy-functional copolymers incorporate at least two different types of polymerized monomers, the first of which have pendent epoxide groups and the second of which have photocrosslinkable groups. The pendent epoxide groups serve to react with and immobilize target molecules on the copolymer film, while the photocrosslinkable groups provide crosslinking in the film. By using different monomers to provide the target binding and crosslinking functions, each function can be controlled and optimized separately by tuning the monomer content of the copolymer.

The epoxy-functional monomers may be any epoxy-functional monomers that are capable of reacting with functional groups on target molecules of interest to bind those target molecules to the copolymer and otherwise possess properties and reactivities that make them suitable for use in the assay and sensor devices into which they are incorporated. For example, it may be desirable to select epoxy-functional monomers that do not react directly with analyte molecules of interest, emit low background signals and do not interfere with copolymer crosslinking. Specific examples of suitable epoxy-functional monomers include, but are not limited to, glycidyl acrylate and glycidyl methacylate. The epoxy-functional monomers may make up a large fraction of the copolymer backbone in order to maximize the available binding sites for target molecules. For example, the copolymers may include at least about 80 mol. % epoxy-functional monomers, at least about 85 mol. % epoxy-functional monomers, at least about 90 mol. % epoxy-functional monomers, at least about 95 mol. % epoxy-functional monomers, or even at least about 98 mol. % epoxy-functional monomers.

The photocrosslinkable monomers may be any photocrosslinkable monomers that are capable of crosslinking the copolymer film and otherwise possess properties and reactivities that make them suitable for use in the assay and sensor devices into which they are incorporated. For example, it may be desirable to select photocrosslinkable monomers that do not react directly with analyte molecules of interest, emit low background signals and do not interfere with target molecule binding. Monomers comprising acryloyloxy groups are well-suited for use in the present copolymers. A specific example of a suitable acryloyloxy-functional monomer is 2-(acryloyloxy)ethyl 2-methacrylate (AOEMA). Mechanically stable copolymer films can be made with a low degree of crosslinking and, therefore, the photocrosslinkable monomers may make up a small fraction of the copolymer backbone. For example, in some embodiments the copolymers may include no greater than about 10 mol. % photocrosslinkable monomer, no greater than about 5 mol. % photocrosslinkable monomer, or even no more than about 2 mol. % photocrosslinkable monomer. However, the copolymers desirably include at least two crosslinking groups per copolymer chain.

In addition to the polymerized epoxy-functional monomers and the polymerized photocrosslinkable monomers the copolymers may optionally include one or more additional polymerized monomers. Such additional monomers are desirably chemically inert with respect to any analytes of interest and do not interfere with the binding of target molecules or photocrosslinking. Such monomers may include monomers that provide additional beneficial properties to the copolymer. For example, the additional monomers may resist the non-specific binding of analyte molecules. Examples of suitable additional monomers include, but are not limited to, acrylics, vinyls and acrylamides.

Poly(glycidyl methacrylate-ran-2-acryloyloxy)ethyl 2-methylacrylate (P(GMA-r-2-AOEMA)) is one specific example of an epoxy-functional copolymer provided by the present invention. P(GMA-r-2-AOEMA) includes both pendant epoxide and acryloyl groups that function independently as target binding sites and crosslinking sites, respectively. When this polymer is used in a biomolecular assay, the epoxide functional groups presented by GMA in the crosslinked film can bind to amine groups presented by biomolecules such as oligonucleotides. In this polymer, the crosslinking group (acryloyl group) is independent of the immobilizing functionality (epoxide), allowing reproducible results and a constant density of epoxide groups in the crosslinked film. The ratio of epoxide groups to acryloyl groups may be tailored to suit a particular application. However, stable thin films of this copolymer can result by incorporating just 1-2 mol. % of crosslinking groups in the polymer structure. The remaining 99-98% functionality in the polymer can be tailored to alter the binding chemistry.

The copolymers may be applied to an underlying substrate using any suitable means of deposition, many of which are known. These include, but are not limited to, spin coating, spray coating, dip coating and roll coating. The copolymer films may be photocrosslinked by exposing the copolymers to a radiation source that activates the photocrosslinkable groups, thereby inducing crosslinking reactions within the film. A photoinitiator may be used to initiate the crosslinking reactions.

Notably, the photocrosslinkable groups are not intended or selected to react with reactive groups on an underlying substrate surface. In fact, an advantage of the present crosslinked copolymer films is that they are mechanically stable and resist delamination even in the absence of (or near absence of) covalent bonds between the copolymer and the underlying substrate. As such, the films may be disposed on any substrate, regardless of the presence or absence of reactive groups on the surface of said substrate. However, the inventors have discovered that film thickness plays an important role in delamination resistance. More specifically, the inventors have discovered that if the copolymer film is too thick, it will undergo delamination from an underlying substrate. Therefore, the films should be sufficiently thin to resist delamination for at least a reasonable period of time (e.g., the expected lifetime of a microarray). Typically, the films are no more than about 100 nm thick. More desirably the films are no more than about 50 nm thick, no more than about 40 nm thick, no more than about 20 nm thick, or even no more than about 10 nm thick.

Because the copolymer films do not need to be covalently bonded to an underlying substrate, a wide range of substrates may be employed. These include common substrates, such as glass, silicon, polymers and metals (e.g., gold), and less common, less reactive substrates, such as stainless steel and polycarbonate.

The present copolymer films provide several advantages over molecular monolayers and other polymer coatings used in microarrays. These include high mechanical stabilities and high target molecule binding site densities. Brief descriptions of methods for measuring and quantifying these properties follow. More detailed descriptions are provided in the Examples section below.

Substrates used in microarrays should be mechanically stable such that they are able to withstand repetitive uses without significant deterioration or delamination. Changes in a polymer film's thickness over time provide a measure of the film's mechanical stability. Therefore, one suitable test for measuring the mechanical stability of a polymer film is to immerse the film in a liquid at a constant temperature and monitor changes in the film's thickness over time. The mechanical stability of the present copolymer films may be tested by immersing the films in deionized water at 50° C. for a two week period. The thickness of the copolymer films may monitored over this time period using ellipsometry. For the purposes of this disclosure, this test will be referred to as "the Mechanical Stability Test." As measured by the Mechanical Stability Test, the present epoxy-functional copolymer films may exhibit a decrease in thickness of 15% or less, 10% or less, or even 5% or less.

The epoxy-functional copolymers provided herein are well-suited for using in microarrays because they may be designed to provide a high density of available binding sites (i.e., available epoxide groups) for target molecules. The density of available epoxide groups may be quantified using the well-known method of binding a primary alkyl amine, such as dodecylamine, to the copolymer to measure the epoxide group density. Based on this method, the present copolymers may have available epoxide group densities of at least 10 molecules/nm$^2$, at least 20 molecules/nm$^2$, or at least 30 molecules/nm$^2$.

The target molecules which react with the available epoxide groups may be any molecules capable of interacting with one or more analyte molecules of interest. The epoxide groups may react directly with the target molecules or indirectly, as in the case where the epoxide groups react with linker molecules or spacer chains on a target molecule. In some embodiments of the present microarrays, the target molecules are biomolecules that interact with (e.g., specifically bind to) other biomolecules. Methods of immobilizing biomolecules on surfaces via epoxide reactions are known. For example, such methods may involve reactions between the epoxide groups on the copolymers and amine groups on the target molecules.

Target biomolecules that may be immobilized on the copolymer films include, but are not limited to, biomolecules independently selected from the group consisting of oligonucleotide sequences, including both DNA and RNA sequences, amino acid sequences, proteins, protein fragments, ligands, receptors, receptor fragments, antibodies, antibody fragments, antigens, antigen fragments, enzymes and enzyme fragments. These target biomolecules are capable of interacting with various analyte biomolecules through interaction mechanisms that include, but are not limited to, receptor-ligand interactions (including protein-ligand interactions), hybridization between complementary oligonucleotide sequences (e.g. DNA-DNA interactions or DNA-RNA interactions), and antibody-antigen interactions. Typically, the analyte molecules will be labeled with a detectable label, such that immobilized analyte molecules may be readily detected. Many suitable labels are known. These include, but are not limited to, fluorescent labels, phosphorescent labels, radioactive labels, and the like.

The target molecules may be reacted with the epoxide groups of the copolymer by exposing the target molecules to the copolymer films under conditions that promote reactions between the epoxide groups of the copolymer and appropriate functional groups (e.g., amine groups) on the target molecules. The target molecules are desirably applied to the copolymer films in a pattern which defines the array. The array typically comprises many different types of target molecules arranged in a known pattern. For example, the array may include isolated spots or regions, wherein different spots or regions include different target molecules or different combinations of target molecules. The arrays may include tens, hundred, thousands, or even higher numbers of such spots. A microspotting device that may be used to form an array of target molecule spots on the copolymer films is described in U.S. Patent Application Publication No. 2004/0071601.

EXAMPLES

The present invention is further illustrated by the following example, which should not be construed as limiting in any way.

Figure 1:
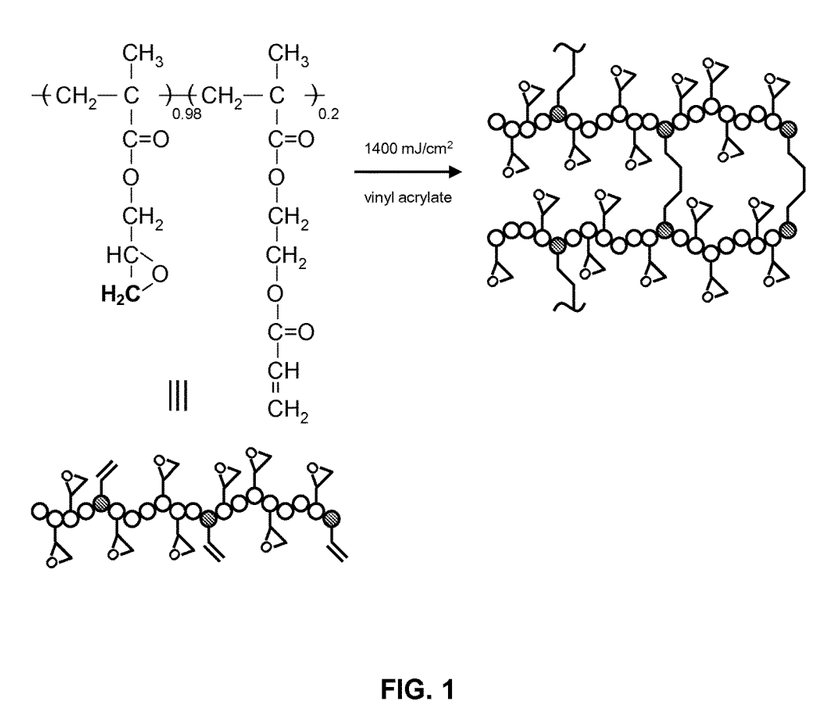
FIG. 1 shows the reaction scheme for crosslinking poly (glycidyl methacrylate-ran-2-(acryloyloxy)ethyl 2-methylacrylate) on a substrate.

This example provide a description of a method for making a random copolymer containing a majority (98 mol %) of glycidyl methacrylate (GMA) and a minority (2%) of 2-(acryloyloxy)ethyl 2-methylacrylate (2-AOEMA). The reaction scheme for the production of this copolymer is shown in FIG. 1, and described in greater detail below. As described below, the copolymer can be spin-coated and photocrosslinked into a stable thin film on a number of substrates, including glass, stainless steel, or polycarbonate substrates, allowing for the proper choice of a substrate with low autofluorescence.

Materials and Methods

Glycidyl methacrylate (GMA), 2-hydroxyethyl methacrylate (HEMA), N,N,N',N',N'-pentamethyldiethylenetriamine (PMDETA), Copper (I) Bromide, ethyl-2-bromoisobutyrate (e-2-bib), acryloyl chloride, vinyl acrylate, methanol, ethanol, diethyl ether, cyclopentanone, and tetrahydrofuran (THF) were purchased from Sigma Aldrich Co. (St. Louis, Mo.). GMA and HEMA were purified by passing them through a column of basic alumina, and stored at −10° C. PMDETA and ethyl-2-bromoisobutyrate were purified by vacuum distillation. The polymer films were compared to epoxy-functional molecular monolayer coated slides (Telechem Superepoxy2™). Telechem Superepoxy2™ will be referred to hereinafter as monolayer epoxide. All other materials were used as received.

Synthesis of Poly(glycidyl methacrylate-r-2-hydroxylethyl methacrylate)

Copper (I) Bromide (CuBr) was added to a clean, dry, air-free polymerization flask. The flask was then evacuated and backfilled with nitrogen three times. GMA, HEMA, THF, and PMDETA were then added via an air-free syringe. A feed ratio of 98:2 (GMA:HEMA) was used. The flask was stirred for ten minutes until a homogeneous solution was obtained by the complete dissolution of CuBr. Ethyl-2-bromoisobutyrate was then added via an air-free syringe, and the flask was degassed with three freeze-purge-thaw cycles. Polymerization was allowed to proceed at 50° C. for thirty minutes. The polymer was then dissolved in THF, and the catalyst was removed by passing the polymer solution through a plug of alumina. The polymer was purified by precipitating it in diethyl ether three times, and dried under vacuum for 16 hours at ambient temperature. The number-averaged and weight-averaged molecular weight and polydispersity (PDI) of the polymer were determined using gas permeation chromatography (GPC) and $H^1$ NMR. $H^1$ NMR (300 MHz, CDCl$_3$, ppm): δ=0.6-1 (br, CH$_3$), 1.75-2.05 (br, CH$_2$), 2.55-2.7 (br, CHOCH$_2$), 2.75-2.9 (br, CHOCH$_2$), 3.15-3.3 (br, CHOCH$_2$), 3.5-3.65 (br, OCH$_2$CH$_2$OH), 3.7-3.85 (br, OCH$_2$CHOCH$_2$), 3.85-4 (br, OCH$_2$CH$_2$OH), 4.2-4.4 (br, OCH$_2$CHOCH$_2$), 4.75-4.9 (br, OCH$_2$CH$_2$OH). GPC (THF, 1.0 mL/min): $M_n$=21,800, PDI=1.25.

Synthesis of Poly(glycidyl methacrylate-r-2-(acryloyloxy)ethyl 2-methylacrylate) from Poly(glycidyl methacrylate-r-2-hydroxylethyl methacrylate)

P(GMA-r-HEMA) was dissolved into THF at 0.1 g/mL. Acryloyl chloride was then added dropwise to the solution. The reaction proceeded for 14 hours. The solution was then diluted with 10 mL of THF and the product was precipitated into cold diethyl ether three times and dried at room temperature under vacuum for 16 hours. The number-averaged and weight-averaged molecular weight, polydispersity (PDI), and incorporation of 2-(acryloyloxy)ethyl 2-methylacrylate) of the polymer were determined using GPC and $H^1$ NMR. $H^1$ NMR (300 MHz, CDCl$_3$, ppm): δ=0.6-1 (br, CH$_3$), 1.75-2.05 (br, CH$_2$), 2.55-2.7 (br, CHOCH$_2$), 2.75-2.9 (br, CHOCH$_2$), 3.15-3.3 (br, CHOCH$_2$), 4.05-4.15 (br, OCH$_2$CH$_2$O(C=O)CH=CH$_2$), 4.2-4.4 (br, OCH$_2$CHOCH$_2$ and OCH$_2$CH$_2$O(C=O)CH=CH$_2$), 5.95-6.05 (br, OCH$_2$CH$_2$O(C=O)CH=CH$_2$), 6.1-6.25 (br, OCH$_2$CH$_2$O(C=O)CH=CH$_2$). GPC (THF, 1.0 mL/min): M=23,200, PDI=1.36.

Substrate Preparation.

Silicon wafers were either diced into 1-cm$^2$ pieces, or one-inch by three-inch glass slides were used. The silicon wafers were used for ellipsometric thickness measurements, and the glass slides were used for fluorescence measurements. The term "substrate" as used herein refers to either wafers or glass slides. The substrate was cleaned by placing it in toluene and sonicating it for 5 minutes, followed by sequential rinsing with acetone and absolute ethanol. The wafers were then dried in a stream of nitrogen at ambient temperature. A second step comprised cleaning the substrate with piranha wash (3:1 H$_2$SO$_4$:H$_2$O$_2$) for 1 hour. The substrate was removed and rinsed with copious amounts of deionized water, acetone, and absolute ethanol. It was then dried with a stream of nitrogen and stored in a desiccator.

Film Preparation.

P(GMA-r-2-AOEMA) was cast from 0.5 and 2.0 weight percent (wt %) cyclopentanone solution at 4000, 3000, 2000, or 1000 rpm, giving 10- to 100-nm-thick films. A 0.5 wt % polymer solution was used for films with thicknesses less than 30 nm, and a 2.0 wt % solution was used for films with thicknesses greater than 30 nm. A photoinitiator, vinyl acrylate, was added to the P(GMA-r-2-AOEMA) solutions at 8 wt % with respect to the polymer. To crosslink P(GMA-r-2-AOEMA), the films were exposed to ultraviolet (UV) light at 254 nm for thirty minutes. The total energy of the exposure was 1400 mJ/cm$^2$. The films were then rinsed with cyclopentanone to remove any uncrosslinked polymer.

Epoxide Group Density Measurements.

In order to estimate the epoxide density, the films were immersed in dilute (0.1 M in ethanol) dodecylamine solutions, and the thicknesses were measured before and after immersion. The density was estimated by using equation 1:

$$\sigma = \frac{602.3 \rho h_d}{M} \quad (1)$$

where σ is the epoxide density (molecules/nm$^2$), ρ is the density of dodecylamine (g/cm$^3$), $h_d$ is the height change after blocking (nm), and M is the molecular weight of dodecylamine (g/mol). (See Mahajan, et al., *Bioconjug. Chem.* 2006, 17, 1184-1189. The theoretical epoxide density was estimated using equation 2:

$$\sigma = \frac{602.3 h \rho x_{GMA}}{(x_{GMA} MW_{GMA} + x_{2AOEMA} MW_{2AOEMA})} \approx \frac{602.3 h \rho}{MW_{GMA}} \quad (2)$$

where σ is the epoxide density (molecules/nm$^2$), h is the thickness of the polymer film (nm), ρ is the density of the polymer, $x_{GMA}$ and $x_{2AOEMA}$ are the mole fractions in the polymer of GMA and 2AOEMA, respectively, and $MW_{GMA}$ and $MW_{2AOEMA}$ are the molecular weights of GMA and 2AOEMA (g/mol), respectively.

Mechanical Stability Measurements.

The mechanical stability of the films was investigated by immersing the films in deionized water, acetone, and THF water at 50° C. for two weeks. The film thicknesses were monitored daily with ellipsometry.

Oligonucleotide Immobilization.

The 16mer DNA oligonucleotide, 5' amino C6 CGAAC-CTTCCITAAGC Cy3 3' (SEQ ID NO: 1), was synthesized and HPLC-purified. The oligonucleotide was diluted to 50

μM in 2×SSC and printed on P(GMA-r-2-AOEMA)-coated glass slides by using a microplotter. Five-by-five arrays were printed at five different locations on each slide with uniform spacing, and centered on the slide. The oligonucleotide-printed slides were then placed in a 100% humidity chamber for 1 hour at room temperature, followed by drying in air for 30 minutes. The surface was blocked by dipping it in 50 mM ethanolamine/0.1M Tris (pH 9.0) for 1 hour at 50° C. It was rinsed with deionized water and dipped in deionized water bath for various washing times at 50° C. and dried with nitrogen gas. The oligo signal of probes coupled to the slides and substrate noise were obtained by a microscanner (GenePix 4000A) at gain 500 and quantified using its software (GenePro 4.0).

DNA Hybridization and Immobilization on UV-Patterned Slides.

P(GMA-r-2-AOEMA) crosslinked films with a thickness of 60 nm were used for hybridization. Two different 16mer probes (probe A=5' amino C6 TTTTTTTTTTTTTTGCTTAAGGAAGGTTCG3' (SEQ ID NO: 2) and B=5' amino C6 TTTTTTTTTTTTTTTGCTTAACCACCATTCG 3' (SEQ ID NO: 3)) diluted at 50 μM in 1×SSC were printed using the same microplotter and immobilized on a P(GMA-r-2-AOEMA)-coated slide as 5×5 arrays, 1 cm apart. Their complementary targets, cA and cB (10 μM in 2×SSPE), were then hand-spotted on each probe array and coverslips were placed on top of the targets. cA is a 16mer oligo complementary to probe A and modified with Quasar 570 at 5'. cB is a 16mer oligo complementary to probe B and modified with Quasar 670 at 5'. The probes and targets used for hybridization were HPLC purified, and were purchased from Biosearch Technologies. The hybridized slides were kept in a 100% humidity chamber for 3 hours at room temperature, and washed in 2×SSPE for 30 min at 35° C. followed by in 1×SSPE for 30 minutes to 3 hours at 35° C. In the final step, the slides were blow-dried using nitrogen gas prior to scanning.

The UV crosslinking procedure described above was also applied to make a pattern on a P(GMA-r-2-AOEMA)-coated slide using a TEM grid (300 mesh) with a hole width of 54 m and a pitch of 85 μm as a photomask. The pre-tagged oligos were immobilized on these patterned slides by washing them in deionized water for at least 1 to 3 hours. These hybridization and UV pattern images were obtained using a GeneTAC UC 4×4 fluorescence microscanner at gain 500. The process described above was used to immobilize the probes and pre-tagged oligos.

Ellipsometry.

The thicknesses of the polymer films on the silicon substrate were determined by ellipsometry, using a Rudolph Auto EL null ellipsometer. Measurements were made at three wavelengths: 633, 546, and 405 nm, at an angle of incidence of 70°. The thickness was determined using FilmEllipse® software version 1.1 (Scientific Company Intl.) from measurements of the ellipsometric angles made at all three wavelengths.

Atomic Force Microscopy.

The surface topography of the polymer films was imaged using a Nanoscope III Multimode atomic force microscope (Digital Instruments) in contact mode. A triangular cantilever with an integral pyramidal $Si_3N_4$ tip was used. The typical imaging force was on the order of $10^{-9}$ N.

Results and Discussion

Figure 2:
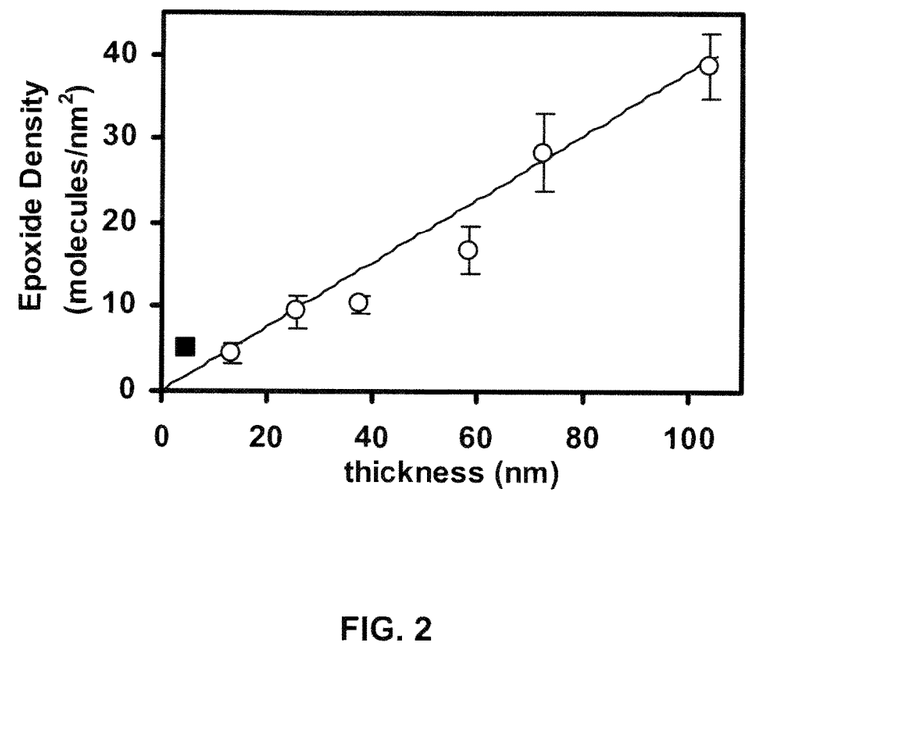
FIG. 2 shows the epoxide density of P(GMA-r-2-AOEMA) films (open circles), estimated by blocking with dodecylamine, and epoxide density of a monolayer of epoxy-functional molecules (filled square).

Quantitative Analysis of the Epoxide Density:

The density of epoxide groups was estimated by measuring the thickness before and after binding dodecylamine. The density was found to scale with the thickness, and was between 4 and 40 molecules/nm$^2$ for thicknesses of 10 to 100 nm. The results of the measurements are shown in FIG. 2. The uncrosslinked films were not evaluated by this method because, upon immersion into dodecylamine, the film degraded, making accurate ellipsometric measurements difficult.

Stability of Films.

Figure 3:
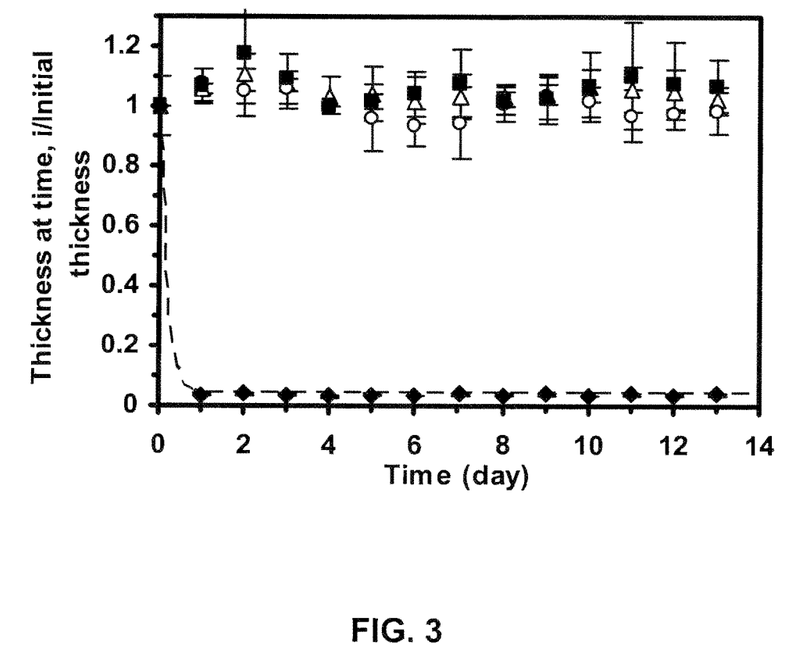
FIG. 3 shows the mechanical stability of crosslinked P(GMA-r-2-AOEMA) in water (unfilled circles), in THF (unfilled triangles), and in acetone (filled squares) at 50° C., and uncrosslinked P(GMA-r-2-AOEMA) (filled diamonds) spin-coated on a glass slide in water at 50° C.

The mechanical stability of 100-nm-thick, crosslinked P(GMA-r-2-AOEMA) films was monitored in deionized water at 50° C. Uncrosslinked films of comparable thickness were also examined. The crosslinked films showed exceptional mechanical stability over a two-week period, as investigated by monitoring the thickness by ellipsometry (FIG. 3). The uncrosslinked film loses 99% of the film thickness after immersion for just one day. P(GMA-r-2-AOEMA) films also exhibited exceptional stability in THF and acetone after a two-week immersion period. The exceptional stability of these films is attributed to the crosslinking of the polymer films. It should be noted that here the crosslinking should occur between the acryloyl groups of two polymer chains, and is independent of the substrate chemistry. However, it is possible that some of these groups also react with the silica or glass surface.

Surface Topography of Films.

The surface topography of P(GMA-r-2-AOEMA) films was investigated with AFM, and the rms surface roughness of the crosslinked polymers was estimated from scans over 2 microns by 2 microns. The 25-nm-thick, crosslinked films can be prepared by either using a 0.5 wt % polymer solution and spin coating at 1000 rpm, or by spin coating a 2.0 wt % solution at 4000 rpm. Table 1 shows the rms roughness of the films after each processing step, obtained over the 2 micron by 2 micron area of the scan. Films obtained with the 2.0 wt % solution after UV exposure and washing have a significantly higher surface roughness (1.5±0.3 nm) than those obtained from 0.5 wt % solution (0.8±0.1 nm).

Table 1 also shows the rms roughness and ellipsometric thickness of 0.5 and 2.0 wt % films after various processing steps.

| wt % | RPM | $t_0$ (nm) | $R_0$ (nm) | $R_{crosslinking}$ (nm) | $t_{final}$ (nm) | $R_{final}$ (nm) |
|---|---|---|---|---|---|---|
| 0.50 | 1000 | 27 | 0.57 | 0.94 | 23 | 0.83 |
| 2.00 | 4000 | 53 | 0.29 | 1.10 | 24 | 1.56 |

$t_0$ and $R_0$ represent the thickness and rms roughness, respectively, of the film prior to crosslinking and rinsing; $R_{crosslinking}$ represents the rms roughness of the film after crosslinking but prior to rinsing; and $t_{final}$ and $R_{final}$ represent the thickness and rms roughness, respectively, of the film after crosslinking and rinsing.

The process of spin coating ($R_0$) produces smooth films with very low roughness (e.g., less than 1 nm). The second step, which involves UV exposure, marginally increases the surface roughness ($R_{crosslinking}$) compared to the first step. After the third step, which comprises washing to remove uncrosslinked chains, the roughness increases significantly. In step 3, the polymer chains that have not been crosslinked are dissolved into the solvent, or partially pulled out of the film, leaving voids in the film. It is also obvious from the entries in Table 1 that the 0.5 wt % film retains 85% of its thickness, but the 2 wt % film retains only 45% of its thickness. The photoinitiator, vinyl acrylate, has a higher vapor pressure than cyclopentanone, which could result in preferential loss of initiator during the spin coating process. Spin coating the 2.0 wt % solution at 4000 RPM results in a greater loss of vinyl acrylate compared to the 0.5 wt % solution, leading to less efficient crosslinking and, hence, increased roughness in the film. The rms roughness for films fabricated from the 0.5 wt % solution does not change significantly after rinsing, but the AFM image suggests that there are more features on the surface of the film.

Oligonucleotide Immobilization.

Figure 4:
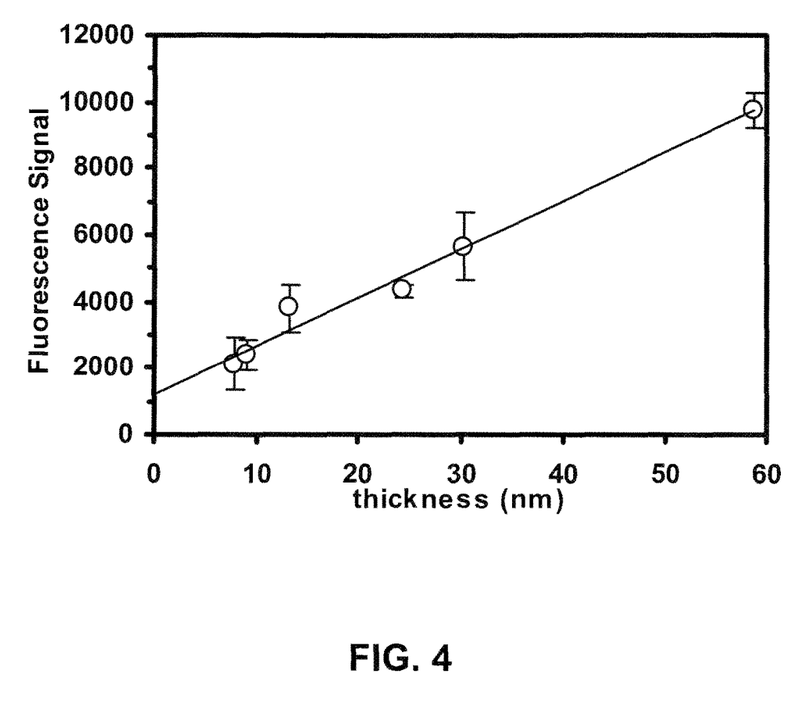
FIG. 4 shows the oligo fluorescence signal on P(GMA-r-2-AOEMA) after a 30-minute washing in deionized water.

The availability of epoxy groups for biofunctionalization was examined in the crosslinked films and compared to the epoxide monolayer substrate. The binding of pre-tagged oligonucleotides to P(GMA-r-2-AOEMA) films was examined. Two main factors that are likely to affect the binding kinetics are the actual density of epoxide groups available on the film, and the additional volume effect as a function of film thickness, which could contribute to the stability of biomolecules bound or trapped in the film structure. The fluorescent signal from the bound oligo increases with increasing film thickness (FIG. 4), a result consistent with the increasing density of the epoxy groups in thicker films, and indicating diffusion of at least some of the printed oligo into the film.

Figure 5:
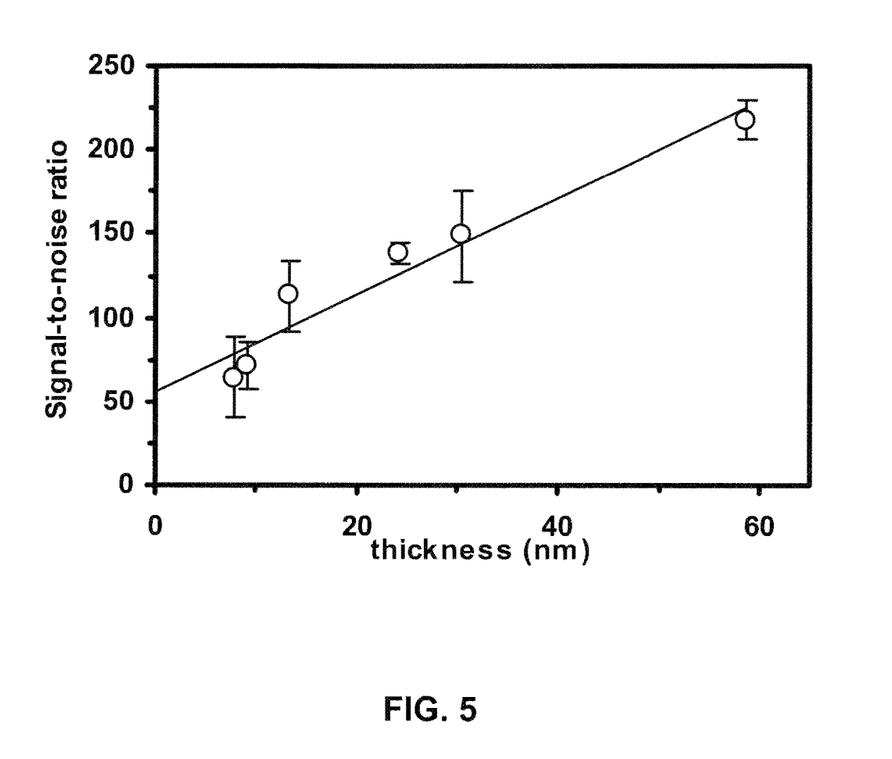
FIG. 5 shows the signal-to-background ratio of a fluorescent signal from a pre-tagged oligonucleotide probe applied to P(GMA-r-2-AOEMA) with various thicknesses, and after a 30-minute washing in deionized water.

An important parameter for any surface-based microarray is the signal-to-background ratio (S/B ratio) when the probe is applied to the array, which sets the sensitivity and dynamic range of the array. The autofluorescence of the piranha-cleaned glass slide is approximately 27. The substrate background of the P(GMA-r-2-AOEMA)-coated slides was found to stay at a constant level, approximately 30 for all film thicknesses, indicating that the crosslinked polymer does not elevate the background. Furthermore, the S/B ratio did not change noticeably with washing time, for up to 2 days. Because of the linear relationship between film thickness and oligo signal and the constant background level, the S/B ratio increases with film thickness (FIG. 5). Thus, the thickest films produced the highest S/B ratios. The S/B ratio reached approximately 225, which is 50% higher than the value for the substrate with a monolayer of epoxide groups (approximately 150).

Oligonucleotide Stability.

Figure 6:
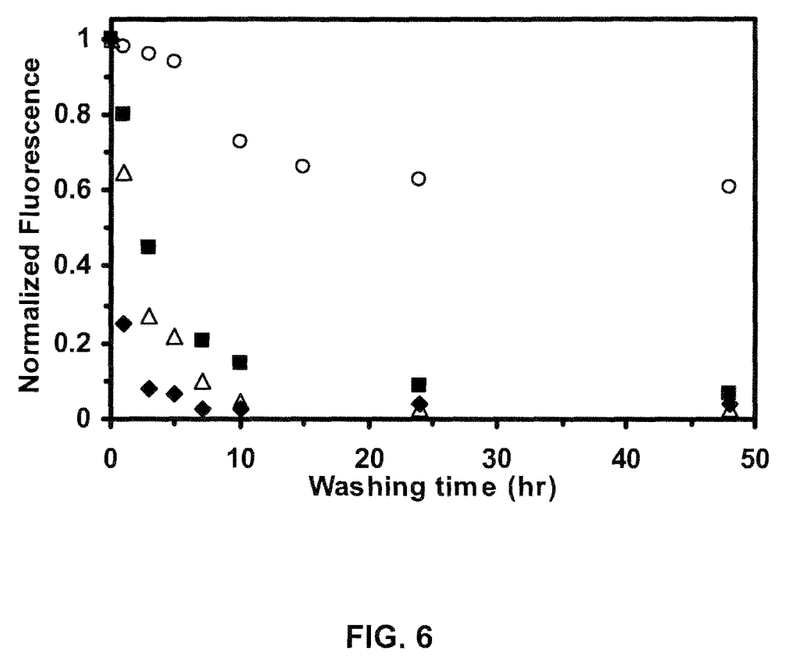
FIG. 6 shows the stability of oligo bound to crosslinked 2.0 wt % P(GMA-r-2-AOEMA) (open circles), epoxide monolayer (filled squares), bare Fisher slide (open triangles), and piranha-cleaned Fisher slides (filled diamonds) in water at 50° C. The data for the copolymer were averaged for all thicknesses. Error bars are omitted to provide a clearer picture.

Most microarray processes use multi-step washing and binding processes; hence, in addition to binding to the microarray substrate, it is also important to retain the immobilized probe for repeated use and reliable quantitative analysis. It is commonly observed that a significant portion of probes is lost after extensive washing, leading to less reliable results. (Chrisey, L. A.; Lee, G. U.; OFerrall, C. E. *Nucleic Acids Res.* 1996, 24, 3031-3039; Dolan, P. L.; Wu, Y.; Ista, L. K.; Metzenberg, R. L.; Nelson, M. A.; Lopez, G. P. *Nucleic Acids Res.* 2001, 29, e107.) The stability of probes on various substrates was investigated, including the stability of crosslinked copolymer-coated glass slides, epoxide monolayer slides, bare (out-of-the-box, uncleaned) Fisher™, and piranha-cleaned Fisher slides. Bare Fisher and piranha-cleaned Fisher slides were used as blanks to evaluate the effect of nonspecific absorption. Deionized water was used as the simplest case to exclude any other chemical effect that might be caused by salts or detergents. All of the substrates were found to lose their bound oligo with long-time washing, but showed significant difference in loss percentage, as shown in FIG. 6. The crosslinked polymer-coated slides lost approximately 40% of their bound oligo after a two-day washing, while the monolayer slide lost approximately 90% of their bound oligo over the same period.

Hybridization and Photopatterning.

The crosslinked, polymer-coated substrates were also tested for binding specificity. Two probes of 5×5 arrays with different sequences (probe A on left and probe B on right) were immobilized, and their complementary targets were successfully hybridized. Another advantage of the UV crosslinkable polymer films is the ability to photopattern the film. We photopatterned the polymer film using a TEM grid as a photomask and subsequently bound oligo to the patterned surface. Thus, the oligo was tethered only to the specific areas containing the polymer film. Typically, additional chemical modifications, such as the use of poly(ethylene glycol) or PEG-coated surfaces, are required to prevent physical adsorption or non-specific absorption. However, with the present copolymer coatings, combining photopatterning with an extended washing time of 1 to 3 hours can eliminate the majority of non-specific binding. (Holzl, M.; Tinazli, A.; Leitner, C.; Hahn, C. D.; Lackner, B.; Tampe, R.; Gruber, H. J. *Langmuir* 2007, 23, 5571-5577; Kannan, B.; Castelino, K.; Chen, F. F.; Majumdar, A. *Biosens. Bioelectron.* 2006, 21, 1960-1967; Bocking, T.; Kilian, K. A.; Hanley, T.; Ilyas, S.; Gaus, K.; Gal, M.; Gooding, J. J. *Langmuir* 2005, 21, 10522-10529; Wolter, A.; Niessner, R.; Seidel, M. *Anal. Chem.* 2007, 79, 4529-4537.)

P(GMA-r-2-AOEMA) on Other Substrates.

In addition to the stability of the film, the immobilized probe densities, the photopatternability, and the higher S/B ratios, the present copolymer films offer the advantage of applicability on a range of non-typical substrates. The formation and stability of P(GMA-r-2-AOEMA) on stainless steel and polycarbonate sheet and the binding of oligonucleotide to the films was demonstrated. Stainless steel was chosen because it is known to have low background or autofluorescence in many applications, such as fluorescence and Raman spectroscopy. Polycarbonate has also been explored as a substrate for developing compact-disc technology for DNA microarrays. (LaClair, J. L.; Burkart, M. D. *Org. Biomol. Chem.*, 2003, 1, 3244-3249.)

Using the same procedures previously optimized for glass and Si wafers, a 60-nm P(GMA-r-2-AOEMA) crosslinked film was fabricated on stainless steel and polycarbonate substrates, as this thickness showed the highest oligonucleotide signal and S/B ratio. Oligonucleotide was then immobilized onto the films using the micro-plotter. The fluorescent signal from the oligonucleotide confirms the immobilization on both substrates. The stability of P(GMA-r-2-AOEMA) was also examined on stainless steel substrates. The films were immersed in water at 50° C. for two weeks, and showed no degradation over this period.

The inventions illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed.

Thus, it should be understood that although the present invention has been specifically disclosed by preferred embodiments and optional features, modification, improvement and variation of the inventions herein disclosed may be resorted to by those skilled in the art, and that such modifications, improvements and variations are considered to be within the scope of this invention. The materials, methods, and examples provided here are representative of preferred embodiments, are exemplary, and are not intended as limitations on the scope of the invention.

For the purposes of this disclosure and unless otherwise specified, "a" or "an" means "one or more." All patents, applications, references and publications cited herein are incorporated by reference in their entirety to the same extent as if they were individually incorporated by reference.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

What is claimed is:

1. A crosslinked copolymer film comprising:
   (a) a substrate; and
   (b) a film having a thickness of no greater than 100 nm disposed on the substrate, the film comprising crosslinked copolymer chains, wherein the copolymer chains comprise at least 90 mole % polymerized epoxy-functional monomers and no greater than 5 mole % of polymerized crosslinking monomers that form crosslinks between the copolymer chains, wherein the crosslinks are only between pendant groups on the polymerized crosslinking monomers of the copolymer chains.

2. The copolymer film of claim 1, wherein the copolymer chains comprise no greater than 2 mole % of the polymerized crosslinking monomers.

3. The copolymer film of claim 1, wherein the crosslinks between the copolymer chains are formed by reactions between acryloyloxy groups on the polymerized crosslinking monomers.

4. The copolymer film of claim 1, wherein the film has a thickness of no greater than 50 nm.

5. The copolymer film of claim 1, wherein the substrate is a polymer substrate that is not covalently bonded to the film.

6. The copolymer film of claim 3, wherein substrate is a polymer substrate that is not covalently bonded to the film.

7. The copolymer film of claim 1, wherein the density of epoxide groups available for binding, as measured by binding dodecylamine to the copolymer chains, is at least 10 dodecylamine molecules/nm$^2$.

SEQUENCE LISTING

<160> NUMBER OF SEQ ID NOS: 3

<210> SEQ ID NO 1
<211> LENGTH: 16
<212> TYPE: DNA
<213> ORGANISM: Artificial Sequence
<220> FEATURE:
<223> OTHER INFORMATION: Description of Artificial Sequence: Synthetic
      oligonucleotides

<400> SEQUENCE: 1
cgaaccttcc ttaagc                                                    16

<210> SEQ ID NO 2
<211> LENGTH: 31
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 2
tttttttttt tttttgctta aggaaggttc g                                   31

<210> SEQ ID NO 3
<211> LENGTH: 31
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 3
tttttttttt tttttgctta accaccattc g                                   31

8. The copolymer film of claim 7, wherein the density of epoxide groups available for binding, as measured by binding dodecylamine to the copolymer chains, is at least 20 dodecylamine molecules/nm$^2$.

9. The copolymer film of claim 1, wherein the substrate is a polymer substrate that is not covalently bonded to the film and further wherein the density of epoxide groups available for binding, as measured by binding dodecylamine to the copolymer chains, is at least 30 dodecylamine molecules/nm$^2$.

10. The copolymer film of claim 9, wherein crosslinks have the structure —C(O)O(CH$_2$)$_2$OC(O)(CH$_2$)$_4$C(O)O(CH$_2$)$_2$OC(O)—.

11. A microarray comprising:
(a) a substrate; and
(b) a film having a thickness of no greater than 100 nm disposed on the substrate, the film comprising crosslinked copolymer chains, wherein the copolymer chains comprise at least 90 mole % polymerized monomers that are bound to target molecules and no greater than 5 mole % of polymerized crosslinking monomers that form crosslinks between the copolymer chains, wherein the crosslinks are only between pendant groups on the polymerized crosslinking monomers of the copolymer chains;
wherein the bonds between the copolymer chains and the target molecules are formed by reactions between epoxy groups on the polymerized monomers and the target molecules.

12. The microarray of claim 11, wherein the substrate is a polymer substrate that is not covalently bonded to the film.

13. The microarray of claim 11, wherein the crosslinks between the copolymer chains are formed by reactions between acryloyloxy groups on the polymerized crosslinking monomers.

14. The microarray of claim 13, wherein the substrate is a polymer substrate that is not covalently bonded to the film.

15. The microarray of claim 11, wherein crosslinks have the structure —C(O)O(CH$_2$)$_2$OC(O)(CH$_2$)$_4$C(O)O(CH$_2$)$_2$OC(O)—.

16. The microarray of claim 11, wherein the film has a thickness of no greater than 50 nm.

* * * * *

UNITED STATES PATENT AND TRADEMARK OFFICE
CERTIFICATE OF CORRECTION

PATENT NO. : 10,100,163 B2
APPLICATION NO. : 14/724104
DATED : October 16, 2018
INVENTOR(S) : Padma Gopalan et al.

It is certified that error appears in the above-identified patent and that said Letters Patent is hereby corrected as shown below:

In the Specification

Column 8, Line 2:
Delete the phrase "M=23,200," and replace with --$M_n$ =23,200,--.

Column 9, Line 43-44:
Delete the phrase "54 m" and replace with --54 µm--.

Signed and Sealed this
Nineteenth Day of March, 2019

Andrei Iancu
*Director of the United States Patent and Trademark Office*